(12) United States Patent
Lee

(10) Patent No.: US 12,155,091 B2
(45) Date of Patent: Nov. 26, 2024

(54) BATTERY MODULE AND BATTERY PACK INCLUDING THE SAME

(71) Applicant: LG Energy Solution, Ltd., Seoul (KR)

(72) Inventor: Hanyoung Lee, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 470 days.

(21) Appl. No.: 17/634,296

(22) PCT Filed: Jul. 24, 2020

(86) PCT No.: PCT/KR2020/009770
§ 371 (c)(1),
(2) Date: Feb. 10, 2022

(87) PCT Pub. No.: WO2021/040242
PCT Pub. Date: Mar. 4, 2021

(65) Prior Publication Data
US 2022/0336926 A1    Oct. 20, 2022

(30) Foreign Application Priority Data
Aug. 23, 2019   (KR) .................... 10-2019-0103781

(51) Int. Cl.
*H01M 50/503* (2021.01)
*H01M 50/581* (2021.01)

(52) U.S. Cl.
CPC ....... *H01M 50/503* (2021.01); *H01M 50/581* (2021.01); *H01M 2200/10* (2013.01); *H01M 2220/20* (2013.01)

(58) Field of Classification Search
CPC ......... H01M 2200/10; H01M 2220/20; H01M 50/211; H01M 50/249; H01M 50/503; H01M 50/521; H01M 50/581; Y02E 60/10
See application file for complete search history.

(56) References Cited

U.S. PATENT DOCUMENTS

| | | |
|---|---|---|
| 2009/0095363 A1 | 4/2009 | Nakakubo et al. |
| 2013/0101875 A1 | 4/2013 | Kim et al. |

(Continued)

FOREIGN PATENT DOCUMENTS

| | | |
|---|---|---|
| CN | 104659323 A | 5/2015 |
| CN | 205376658 U | 7/2016 |

(Continued)

OTHER PUBLICATIONS

Machine translation WO2020197040 (Year: 2020).*

(Continued)

*Primary Examiner* — Victoria H Lynch
(74) *Attorney, Agent, or Firm* — Lerner David LLP

(57) ABSTRACT

A battery module according to one embodiment of the present disclosure can include a battery cell stack including a plurality of stacked battery cells, a first bus bar connected to an electrode lead extending from the battery cells, a connection member connected to the first bus bar for connecting with other adjacent battery modules. The first bus bar can includes a first part connected to the electrode lead and a second part connected to the connection member. A protrusion part can be formed in any one of the first part and the second part, and a through opening into which the protrusion part is inserted is formed in the other one. The protrusion part can be inserted into the through opening to connect the first part and the second part. The protrusion part can include a material that shrinks in volume or changes its shape when the temperature rises.

12 Claims, 4 Drawing Sheets

(56) References Cited

U.S. PATENT DOCUMENTS

| | | |
|---|---|---|
| 2013/0288530 A1 | 10/2013 | Zhao |
| 2015/0140410 A1 | 5/2015 | Kim et al. |
| 2016/0211499 A1 | 7/2016 | Cho |
| 2019/0036101 A1 | 1/2019 | Tyler et al. |
| 2019/0348720 A1 | 11/2019 | Oh et al. |
| 2019/0389318 A1 | 12/2019 | Lee et al. |
| 2020/0014005 A1 | 1/2020 | Lee et al. |
| 2020/0144580 A1 | 5/2020 | Hong et al. |
| 2020/0168887 A1 | 5/2020 | Yoo et al. |
| 2022/0140448 A1 | 5/2022 | Lee |

FOREIGN PATENT DOCUMENTS

| | | |
|---|---|---|
| JP | S62202774 U | 12/1987 |
| JP | 2005005215 A | 1/2005 |
| JP | 2015507819 A | 3/2015 |
| KR | 20150028073 A | 3/2015 |
| KR | 20160016363 A | 2/2016 |
| KR | 20160089133 A | 7/2016 |
| KR | 20180077695 A | 7/2018 |
| KR | 20180091446 A | 8/2018 |
| KR | 20180107467 A | 10/2018 |
| KR | 20180125796 A | 11/2018 |
| KR | 20180138028 A | 12/2018 |
| KR | 20190001408 A | 1/2019 |
| KR | 20190071454 A | 6/2019 |
| KR | 20190096674 A | 8/2019 |
| WO | 2008026714 A1 | 3/2008 |
| WO | 2019117514 A1 | 6/2019 |
| WO | 2020197040 A1 | 10/2020 |

OTHER PUBLICATIONS

Search Report dated Sep. 10, 2023 from the Office Action for Chinese Application No. 202080056245.X issued Sep. 13, 2023, pp. 1-3. [See pp. 1-2, categorizing the cited references].

Search report from International Application No. PCT/KR2020/009770, mailed Oct. 30, 2020.

\* cited by examiner

[FIG. 1]
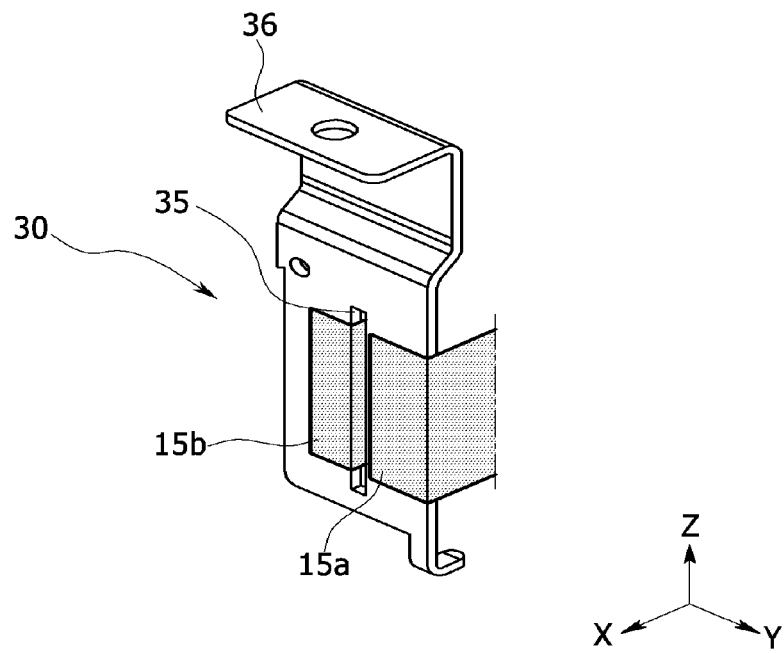
[FIG. 2]
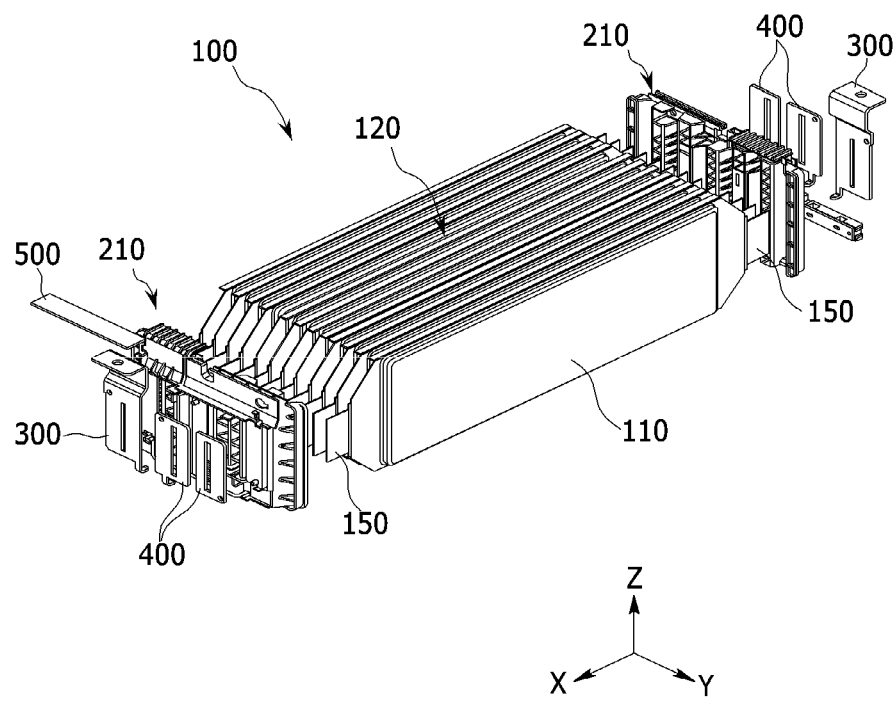

[FIG. 3]
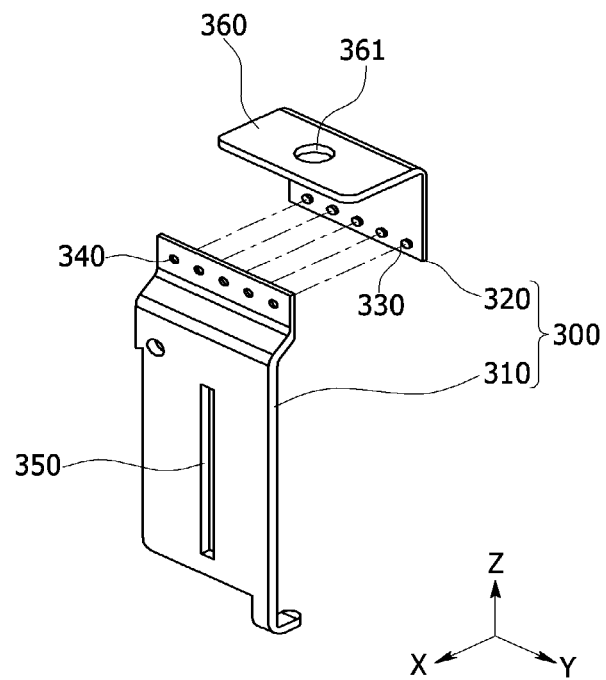
[FIG. 4]
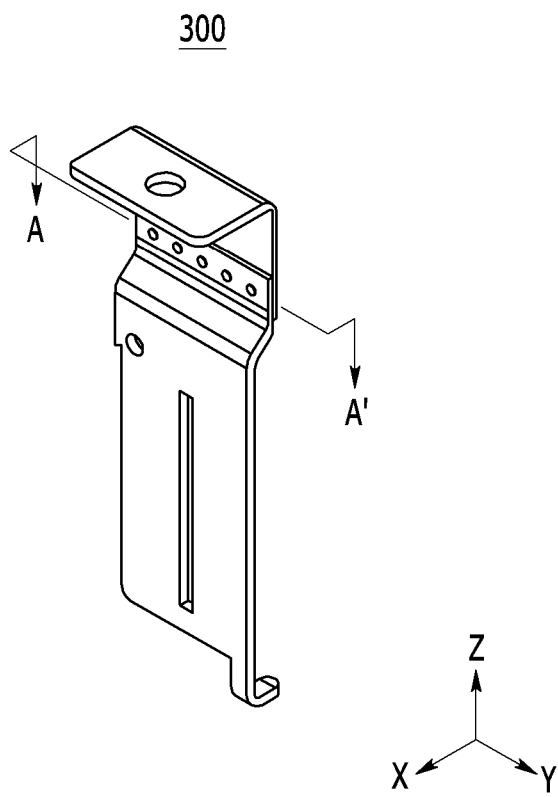

【FIG. 5】
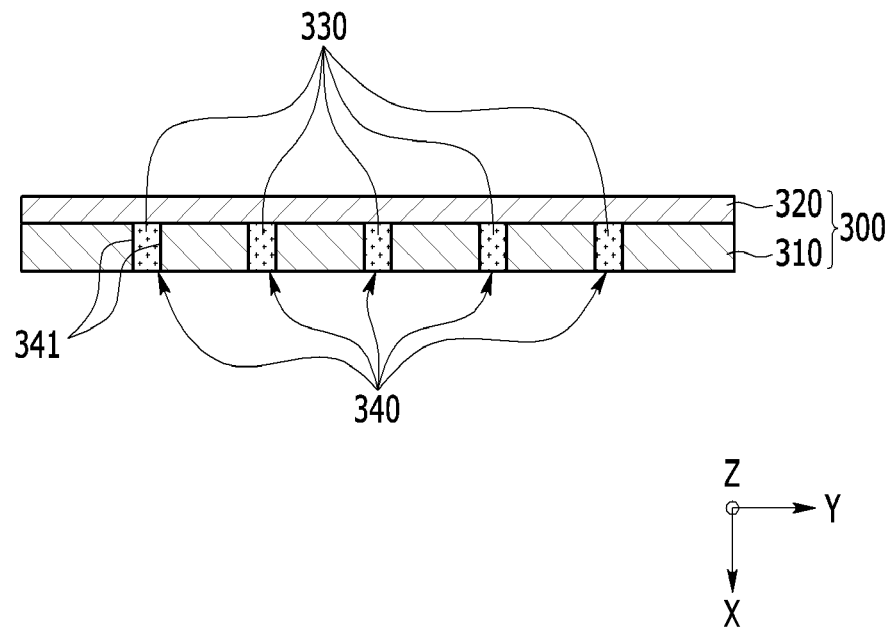
【FIG. 6】
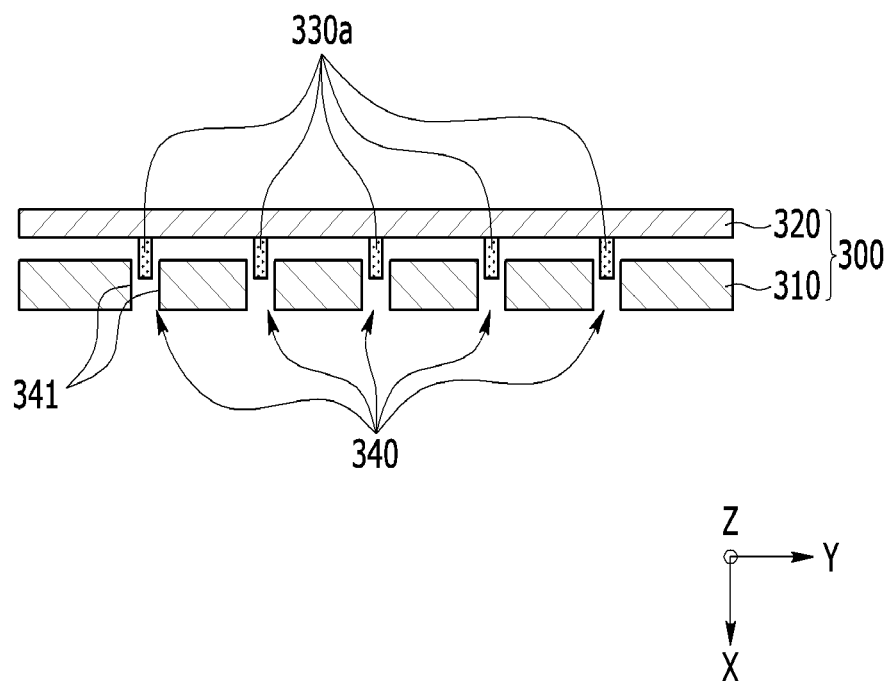

[FIG. 7]
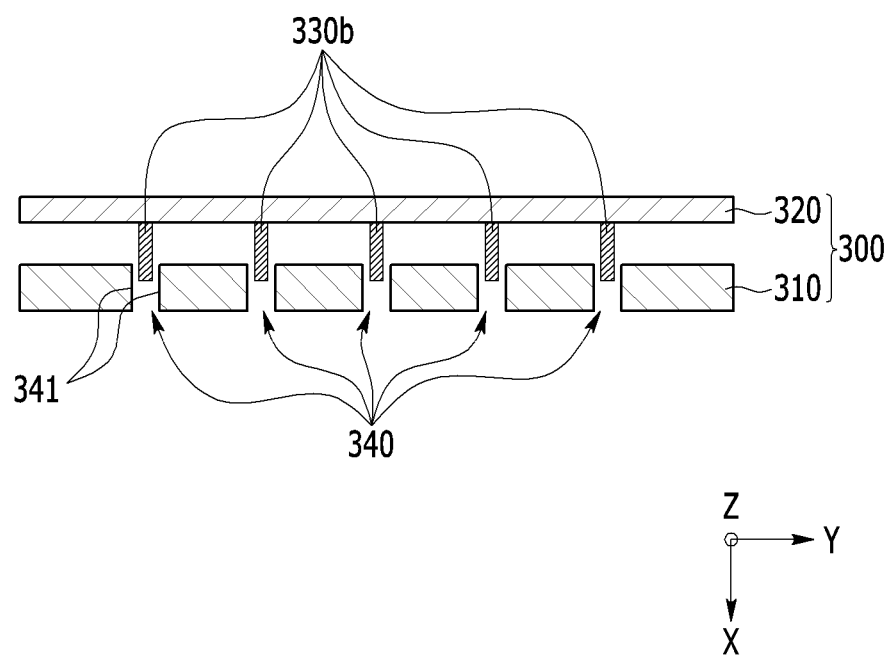

BATTERY MODULE AND BATTERY PACK INCLUDING THE SAME

CROSS CITATION WITH RELATED APPLICATION(S)

This application is a national phase entry under 35 U.S.C. § 371 of International Application No. PCT/KR2020/009770 filed on Jul. 24, 2020, which claims the benefit of Korean Patent Application No. 10-2019-0103781 filed on Aug. 23, 2019, with the Korean Intellectual Property Office, the disclosures of which are incorporated herein by reference in their entirety.

TECHNICAL FIELD

The present disclosure relates to a battery module and a battery pack including the same, and more particularly to a battery module with improved safety against an abnormal operation state, and a battery pack including the same.

BACKGROUND ART

Secondary batteries, which are easily applicable to various product groups and have electrical characteristics such as high energy density, are universally applied not only for a portable device but also for an electric vehicle or a hybrid electric vehicle, an energy storage system or the like, which is driven by an electric driving source. Such secondary batteries are attracting attention as a new environment-friendly energy source for improving energy efficiency since it gives a primary advantage of reducing the use of fossil fuels and also does not generate by-products from the use of energy.

In the case of a secondary battery used for small-sized devices, two to three battery cells are arranged, but in the case of a secondary battery used for a medium to large-sized devices such as an automobile, a battery module in which a large number of battery cells are electrically connected is used. In such a battery module, a plurality of battery cells are connected to each other in series or in parallel to form a cell stack, thereby improving capacity and output. In addition, a plurality of battery modules can be mounted together with various control and protection systems such as a battery management system (BMS) and a cooling system to form a battery pack.

In this case, the battery module has a structure in which a plurality of battery cells are connected in series or in parallel to each other to form a battery cell stack, wherein bus bars may be used for electrical connection between battery cells. The electrode lead protruding from each battery cell is joined to the bus bar, thereby enabling such electrical connection.

Furthermore, the bus bar of any one battery module and the bus bar of the other battery module are electrically connected via a connection member, connection between battery modules is also possible.

FIG. 1 is a perspective view showing a bus bar 30 and electrode leads 15a and 15b of a conventional battery module, and for convenience of explanation, only necessary configurations are illustrated.

Referring to FIG. 1, the electrode leads 15a and 15b protruding in the X-axis direction in a battery cell (not shown) are bent so as to face in the direction opposite to the Y-axis, so that they can be joined with the bus bar 30. In particular, a slit 35 may be formed in the bus bar 30, and some electrode leads 15b may be bent through the slit 35 and then joined to the bus bar 30. The other electrode lead 15a may pass through one side surface of the bus bar 30 instead of the slit 35.

Further, the bus bar 30 may have a connection part 36 extended upward, and a connection member (not shown) may be connected to the connection part 36. The connection member is connected to a bus bar (not shown) of the other battery module, and electrical connection between the battery modules may be made via the connection member. That is, electrical connection between battery cells as well as electrical connection between battery modules may be made by the bus bar 30.

Meanwhile, when the secondary battery is exposed to high temperature, or when large current flows within a short time due to overcharging, external short circuit, nail penetration, local damage, etc., there is a risk of causing an explosion while the battery is heated by IR heat generation. That is, when the pressure or temperature of the battery rises, the decomposition reaction of the active material and many side reactions proceed, whereby the temperature of the battery rises rapidly, which again accelerates reaction between the electrolyte solution and the electrode. Eventually, a thermal runaway phenomenon occurs in which the temperature of the battery rises rapidly, and when the temperature rises above a certain level, the battery may ignite, and the secondary battery explodes due to the increased internal pressure of the battery.

Therefore, when the secondary battery is placed in an abnormal operation state such as an overcurrent state or a high temperature state, a current interruptive device (CID) for interrupting the current may be provided.

However, when the current interruptive device (CID) is applied to a medium or large-sized battery pack including a plurality of battery modules, there are several problems as follows.

In the case of the current interruptive device (CID) used in conventional small-sized batteries, when the internal pressure of the battery cell rises, safety is ensured by using the principle of disconnecting a specific part to interrupt the current. However, applying this to a medium or large-sized battery pack causes a problem that the resistance becomes very high.

Further, in the case of the current interruptive device (CID) applied to the prismatic battery cells of medium or large-sized battery packs, when the internal voltage of the battery cell increases, a method of forcibly generating an external short circuit and melting electrode leads of the battery cell to thereby interrupt the current is used, but this method has a problem that it operates even when the cell internal pressure increases in the End of Life (EOL) section.

DETAILED DESCRIPTION OF THE INVENTION

Technical Problem

Embodiments of the present disclosure have been designed to solve the above-mentioned problems of the existing proposed methods, and an object of the present disclosure is to provide a battery module that can effectively interrupt a current in an abnormal operation state without increasing resistance in a normal operation state, and a battery pack including the same.

However, the problem to be solved by embodiments of the present disclosure is not limited to the above-described problems, and can be variously expanded within the scope of the technical idea included in the present disclosure.

Technical Solution

A battery module according to one embodiment of the present disclosure includes a battery cell stack in which a plurality of battery cells are stacked; a first bus bar connected to an electrode lead extending from the battery cells; a connection member connected to the first bus bar for connecting with other adjacent battery modules, wherein the first bus bar includes a first part connected to the electrode lead and a second part connected to the connection member, wherein a protrusion part is formed in any one of the first part and the second part, and a through opening into which the protrusion part is inserted is formed in the other one, wherein the protrusion part is inserted into the through opening to connect the first part and the second part, and wherein the protrusion part includes a material that shrinks in volume or changes its shape when the temperature rises.

The protrusion part may include a shape memory alloy that shrinks in volume as the temperature rises.

The protrusion part may include a shape memory alloy that changes its shape as the temperature rises.

The protrusion part may change its shape as the temperature rises, so that a width in a direction parallel to the second part decreases, and a height in a direction perpendicular to the second part increases.

The inner wall of the through opening and the protrusion part may be in close contact with each other.

The protrusion part may be inserted into the through opening to form a clinching joint.

The second part may include a connection part that is joined with the connection member.

The protrusion part may have a shape corresponding to the through opening.

Each of the protrusion part and the through opening may be formed in two or more numbers.

A slit is formed may be in the first part, and the electrode lead may be bent after passing through the slit, and connected to the first part.

A bus bar frame may be located between the first bus bar and the battery cell stack, and the first bus bar may be mounted on the bus bar frame.

Advantageous Effects

According to one embodiment of the present disclosure, the bus bar joined to the connection member can be provided with a fastening structure of a protrusion part and a through opening, and such bus bar does not increase resistance in a normal operation state, but can effectively interrupt current in an abnormal operation state.

BRIEF DESCRIPTION OF THE DRAWINGS

FIG. 1 is a perspective view showing a bus bar and an electrode lead of a conventional battery module.

FIG. 2 is an exploded perspective view of a battery module according to one embodiment of the present disclosure.

FIG. 3 is an exploded perspective view of a first bus bar of the battery module of FIG. 2.

FIG. 4 is an assembled perspective view of the first bus bar of FIG. 3.

FIG. 5 is a cross-sectional view cut along the cutting line A-A' of FIG. 4.

FIG. 6 is a cross-sectional view of the first bus bar showing a protrusion part in an abnormal operation state.

FIG. 7 is a cross-sectional view of the first bus bar showing a protrusion part in an abnormal operation state.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that it can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 2 is an exploded perspective view of the battery module 100 according to one embodiment of the present disclosure.

Referring to FIG. 2, a battery module 100 according to the present disclosure includes a battery cell stack 120 in which a plurality of battery cells 110 are stacked; first bus bars 300 and 400 connected to an electrode lead 150 extending from the battery cells 110; and bus bar frames 210 mounted with the bus bars 300 and 400.

The bus bar frames 210 include lead slots, the lead slots are aligned so as to correspond to the slots formed in the bus bars 300 and 400, and the electrode lead 150 may be electrically connected to the bus bars 300 and 400. Specifically, the electrode lead 150 can be bent after passing through the lead slot and the slot of the bus bars 300 and 400, and connected to the bus bars 300 and 400.

The battery cell 110 is a secondary battery and may be configured of a pouch-type secondary battery. These battery cells 110 may be configured in plural numbers, and the plurality of battery cells 110 may be stacked to each other so as to be electrically connected to each other, thereby forming a battery cell stack 120.

Meanwhile, the bus bars 300 and 400 according to the present embodiment may be made of a metal material.

Among the bus bars 300 and 400, the first bus bar 300 is connected not only to the electrode lead 150 but also to the connection member 500, and the connection member 500 may be connected to a bus bar (not shown) of the other battery module. That is, the battery module 100 of the present embodiment includes a connection member 500 for connecting a battery module and another battery module.

Since the first bus bar 300 is connected to such connection member 500, it performs the role of not only electrically connecting the battery cells 110 but also electrically connecting the battery modules.

FIG. 3 is an exploded perspective view of a first bus bar 300 included in the battery module 100 of FIG. 2.

Referring to FIG. 3 together with FIG. 2, the first bus bar 300 includes a first part 310 connected to the electrode lead 150 and a second part 320 connected to the connection member 500.

A slit 350 may be formed in the first part 310 so that the electrode lead 150 can pass through. As mentioned above, the electrode lead 150 can be bent after passing through the lead slot and the slit 350 of the bus bar frame 210 together, and connected to the first part 310.

The connection between the first part 310 and the electrode lead 150 is not particularly limited as long as electrical connection is possible, but may be mutually joined by welding.

The second part 320 may include a connection part 360 that is joined to the connection member 500, and the connection part 360 may form a bent structure as shown in FIG. 3 for easily joining with the connection member 500.

Further, a module connection terminal 361 may be formed in the connection part 360. The module connection terminal 361 is configured to receive a fastening member such as bolt to connect adjacent battery modules—i.e., the module connection terminal 361 can function as a nut to receive the bolt. In a state in which the connection member 500 and the connection part 360 are in contact with each other, a bolt is fastened to the module connection terminal 361 so that the connection member 500 and the connection part 360 can be physically and electrically connected. Although only one module connection terminal 361 is illustrated, but it goes without saying that one or more module connection terminals 361 may be formed as needed.

In addition, in the connection member 500, it is more preferable that the area excluding the portion where the bolt and the nut are fastened as described above is subjected to an insulating coating or covered with an insulator, thereby being electrically insulated from the outside.

On the other hand, the second bus bar 400 of FIG. 2 can perform only the role of electrically connecting the electrode leads 150 extended from the battery cells 110, without being formed with such a connection part 360.

The connection member 500 in FIG. 2 is shown in a shape of plate, but the shape or material thereof is not limited as long as it can be connected to the connection part 360 of FIG. 3 to perform electrical connection between battery modules. That is, the connection member 500 may be in the shape of plate or in the shape of electric wire, and it goes without saying that other shapes that enables electrical connection are also possible.

Meanwhile, a protrusion part may be formed in any one of the first part 310 and the second part 320, and a through opening may be formed in the other one. In FIG. 3, it is shown that the through opening 340 is formed in the first part 310 and the protrusion part 330 is formed in the second part 320, but this corresponds to one example. A protrusion part may be formed in the first part 310 and a through opening may be formed in the second part 320. Further, although a circular through opening 340 is shown, the shape is not limited as long as it is a shape of being perforated in the first part 310 or the second part 320, and thus a polygonal through opening is possible.

The protrusion part 330 is inserted into the through opening 340 along the X-axis direction, so that the first part 310 and the second part 320 may be connected to each other. For this purpose, the protrusion part 330 may be disposed at a position corresponding to the through opening 340.

In addition, it is preferable that the protrusion part 330 has a shape corresponding to the through opening 340. For example, as shown in FIG. 3, when the through opening 340 formed in the first part 310 is circular, the protrusion part 330 is preferably a cylinder. However, this is an example, and although not illustrate, when a polygonal through opening is formed, the protrusion part may have a shape of a polygonal pillar corresponding thereto.

Meanwhile, in order to firmly fasten the first part 310 and the second part 320, the protrusion part 330 may be inserted into the through opening 340 to form a clinching joint. For such joining, it is preferable that among the area of the protrusion part 330, the area of the plane perpendicular to the insertion direction of the protrusion part 330 is slightly larger than the area formed by the through opening 340. In other words, in FIG. 3, it is preferable that the circular area provided by the cylindrical protrusion part 330 is slightly larger than the circular area formed by the circular through opening 340.

Thus, when the protrusion part 330 is inserted while being fitted to the through opening 340, the inner wall of the through opening 340 and the protrusion part 330 form a structure in which the protrusion part 330 is in close contact with each other. In a normal operation state, the first part 310 and the second part 320 may be firmly fastened. This will be described again in FIG. 5 below.

FIG. 4 is a perspective view showing a state in which the first part 310 and the second part 320 of the first bus bar 300 of FIG. 3 are fastened to each other. That is, this is a perspective view showing a state in which the protrusion part 330 of the second part 320 in FIG. 3 is inserted into the through opening 340 of the first part 310, so that the first part 310 and the second part 320 are fastened.

In a normal operation state, the first bus bar 300 integrated as shown in FIG. 4 is connected to the connection member to electrically connect the battery modules.

FIG. 5 is a cross-sectional view cut along the cutting line A-A' of FIG. 4. In particular, this is a cross-sectional view in a normal operation state.

Referring to FIG. 5, as mentioned above, when the protrusion part 330 is inserted while fitting into the through opening 340 due to the clinching joining, the inner wall 341 of the through opening 340 and the protrusion part 330 may form a structure in which they are in close contact with each other.

Through this, the first part 310 and the second part 320 can be firmly fastened, and in a normal operation state, the first bus bar 300 does not allow it to affect resistance, so that current between the battery modules can be smoothly transferred.

Further, each of the protrusion part 330 and the through opening 340 is not limited by the number thereof, but in order to firmly fasten the first part 310 and the second part 320, it is preferable that the number is two or more.

The protrusion part 330 includes a material that shrinks in volume or changes its shape when the temperature rises. That is, when the battery module is placed in an abnormal operation state such as an overcurrent state or a high temperature state, the temperature of the protrusion part 330 rises, and the volume contracts or the shape changes. Hereinafter, this will be described in detail with reference to FIGS. 6 and 7.

Each of FIGS. 6 and 7 is a cross-sectional view of the first bus bar of FIG. 5 in an abnormal operation state. Specifically, FIG. 6 is a cross-sectional view of the first bus bar 300 having a protrusion part 330a that shrinks in volume as the temperature rises in an abnormal operation state, and FIG. 7 is a cross-sectional view of the first bus bar 300 having a protrusion part 330b that changes its shape as the temperature rises in an abnormal operation state.

First, referring to FIG. 6, when an abnormal operation state such as an overcurrent state or a high temperature state occurs, the temperature of the protrusion part 330a of the present embodiment rises, and when the temperature rises above a certain level, the volume may shrink.

For this purpose, the protrusion part 330a may include a material that shrinks in volume as the temperature rises. The material that shrinks in volume may include a shape memory alloy. More specifically, the shape memory alloy may be welded to the second part 320 and then nickel plated to form the protrusion part 330a. In a normal operation state, it maintains electrical conductivity through nickel plating, and in the abnormal operation state, when the temperature rises above a certain level, the volume of the shape memory alloy decreases, so that the volume of the protrusion part 330a may decrease.

At this time, the temperature at which the volume shrinkage of the shape memory alloy occurs is preferably 100 to 120 degrees Celsius in order to ensure safety against abnormal operation state.

As shown in FIG. 6, since the volume of the protrusion part 330a shrinks, the protrusion part 330a is separated from the inner wall 341 of the through opening 340, so that the connection between the protrusion part 330a and the through opening 340 becomes loose. As a result, the connection force between the first part 310 and the second part 320 may be reduced, and thus separated from each other. Based on such a principle, the current flowing inside the battery module can be interrupted, thereby improving safety against abnormal operation state.

Referring to FIG. 7, the protrusion part 330b may include a material that changes its shape when the temperature rises. For example, it may include a shape memory alloy that changes its shape as the temperature rises above a certain level.

Similarly, the shape memory alloy may be welded to the second part 320 and then nickel plated to form the protrusion part 330b. In a normal operation state, it maintains electrical conductivity through nickel plating, and in an abnormal operation state, when the temperature rises above a certain level as the temperature rises, the shape of the shape memory alloy may change and thus, the shape of the protrusion part 330b may change.

In particular, when the temperature of the protrusion part 330b rises due to an abnormal operation state, the width of the protrusion part 330b in the direction parallel to the second part 320 (Y-axis direction) may decrease, and the height in the direction perpendicular to the second part 320 (X-axis direction) may increase.

When the protrusion part 330b has a cylindrical shape, a reduction in the width in a direction parallel to the second part 320 (Y-axis direction) may be a reduction in the diameter of the cylinder, and an increase in the height in the direction perpendicular to the second part 320 (X-axis direction) may be an increase in the height of the cylinder.

As described above, since the width in the direction parallel to the second part 320 (Y-axis direction) decreases, the protrusion part 330b is separated from the inner wall 341 of the through opening 340 so that the connection with the first part 310 becomes loose. As a result, the connection force between the first part 310 and the second part 320 is reduced, so that they are easily separated from each other.

Further, since the height in the direction perpendicular to the second part 320 (X-axis direction) increases, the protrusion part 330b has the effect of pushing the second part 320 from the first part 310, which may be more advantageous for current interruption.

At this time, since the volume of the protrusion part 330b is not limited, the volume of the protrusion part 330b can be reduced, increased or maintained in response to the reduction in width and increase in height as described above.

On the other hand, the temperature at which the shape change of the shape memory alloy occurs is preferably 100 to 120 degrees Celsius in order to secure the safety against abnormal operation states.

Further, in the present disclosure, when an abnormal operation state occurs, instead of replacing the entire battery pack, only the battery module in which the fastening of the first part 310 and the second part 320 are separated can be replaced as shown in FIGS. 6 and 7, which is more efficient.

On the other hand, although not specifically illustrated, the battery module of the present disclosure may include a configuration of a module frame and an end plate that houses a battery cell stack or the like and protects it from the outside.

One or more battery modules according to the present embodiment described above may be mounted together with various control and protection systems such as a battery management system (BMS) and a cooling system to form a battery pack.

The battery module or the battery pack can be applied to various devices. These devices may be applied to transportation means such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
210: bus bar frame
300: first bus bar
310: first part
320: second part
330: protrusion part
340: through opening
360: connection part
400: second bus bar
500: connection member

The invention claimed is:

1. A battery module comprising:
   a battery cell stack including a plurality of stacked battery cells;
   a first bus bar connected to an electrode lead extending from the plurality of stacked battery cells;
   a connection member connected to the first bus bar, the connection member configured to connect with one or more adjacent battery modules,
   wherein the first bus bar includes a first part connected to the electrode lead and a second part connected to the connection member,
   wherein a protrusion part from the first part or the second part is configured to be received within a corresponding through opening of the first part or the second part,
   wherein the protrusion part is inserted into the through opening to connect the first part and the second part, and
   wherein the protrusion part includes a material that shrinks in volume or changes its shape when the temperature rises.

2. The battery module according to claim 1, wherein the material is a shape memory alloy that shrinks in volume as the temperature rises.

3. The battery module according to claim 1, wherein the material is a shape memory alloy that changes its shape as the temperature rises.

4. The battery module according to claim 1, wherein the protrusion part changes its shape as the temperature rises such that a width of the protrusion part in a direction parallel to the second part decreases, and a height of the protrusion part in a direction perpendicular to the second part increases.

5. The battery module according to claim 1, wherein an inner wall of the through opening contacts an inner wall of the protrusion part.

6. The battery module according to claim 1, wherein the protrusion part is inserted into the through opening to form a clinching joint.

7. The battery module according to claim 1, wherein the second part includes a connection part that is joined with the connection member.

8. The battery module according to claim 1, wherein the protrusion part has a shape corresponding to the through opening.

9. The battery module according to claim 1, wherein the battery module includes a plurality of protrusion parts and a plurality of through openings.

10. The battery module according to claim 1, wherein the first part includes a slit to allow the electrode lead to pass therethrough,
    the electrode lead being bent after passing through the slit to connect the electrode lead to the first part.

11. The battery module according to claim 1,
    wherein a bus bar frame is located between the first bus bar and the battery cell stack,
    the first bus bar being mounted on the bus bar frame.

12. A battery pack comprising one or more battery modules of claim 1.

* * * * *